United States Patent
Simpson, III

(10) Patent No.: US 6,993,599 B2
(45) Date of Patent: *Jan. 31, 2006

(54) EFFICIENT COMMAND DELIVERY AND DATA TRANSFER

(75) Inventor: Cecil R. Simpson, III, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/345,817

(22) Filed: Jan. 15, 2003

(65) Prior Publication Data

US 2003/0110326 A1 Jun. 12, 2003

Related U.S. Application Data

(63) Continuation of application No. 09/409,253, filed on Sep. 30, 1999, now Pat. No. 6,542,941.

(51) Int. Cl.
*G06F 3/00* (2006.01)

(52) U.S. Cl. .............................. 710/30; 710/5; 710/33
(58) Field of Classification Search ................ 710/30, 710/5, 7, 20, 21, 33
See application file for complete search history.

(56) References Cited

U.S. PATENT DOCUMENTS

| | | | | |
|---|---|---|---|---|
| 4,489,378 A | | 12/1984 | Dixon et al. ................... 710/33 |
| 4,860,193 A | | 8/1989 | Bentley et al. ................ 710/55 |
| 5,038,277 A | | 8/1991 | Altman et al. ................. 710/56 |
| 5,208,810 A | * | 5/1993 | Park ............................ 370/230 |
| 5,271,009 A | * | 12/1993 | Takano et al. ............... 370/473 |
| 5,475,433 A | * | 12/1995 | Jeong ....................... 375/240.05 |
| 5,550,957 A | | 8/1996 | Davidson Jr. et al ...... 358/1.15 |
| 5,633,870 A | | 5/1997 | Gaytan et al. ............... 370/235 |
| 5,777,624 A | * | 7/1998 | Munson ....................... 345/605 |
| 5,937,436 A | | 8/1999 | Watkins ....................... 711/202 |
| 6,112,263 A | | 8/2000 | Futral ............................ 710/37 |
| 6,125,433 A | | 9/2000 | Horstmann et al. .......... 711/160 |
| 6,185,607 B1 | * | 2/2001 | Lo et al. ...................... 709/213 |
| 6,243,778 B1 | * | 6/2001 | Fung et al. .................. 710/113 |
| 6,260,129 B1 | | 7/2001 | Crockett et al. ............. 711/170 |
| 6,279,140 B1 | * | 8/2001 | Slane .......................... 714/807 |
| 6,324,178 B1 | * | 11/2001 | Lo et al. ...................... 370/392 |
| 6,423,778 B1 | | 7/2002 | McGee et al. .............. 525/165 |
| 6,615,282 B1 | | 9/2003 | Futral ............................ 710/1 |

OTHER PUBLICATIONS

Alan Benner et al., "Fibre Channel Gigabit Communications and I/O for Computer Netorks", McGraw Hill 1996, Chapters, 6, 7, 8, 12, and 17.

* cited by examiner

*Primary Examiner*—Kim Huynh
*Assistant Examiner*—Harold Kim
(74) *Attorney, Agent, or Firm*—Christopher K. Gagne

(57) ABSTRACT

In an example embodiment, a method of delivering a command from an initiator device also transfers data identified by the command to a target device. The data is transferred between the initiator device and the target device according to a selected maximum payload size. The method includes determining whether or not the size of the data associated with the command is greater than the selected maximum payload size. If the size of the data associated with the command is not greater than the selected maximum payload size, then a block is transferred to or from the target device which includes the command and all of the data associated with the command. If the size of the data associated with the command is greater than the selected maximum payload size, then a block is transferred to or from the target device which includes the command, an amount of data associated with the command equal to the selected maximum payload size and an indication that not all of the data associated with the command was included in the transferred block.

34 Claims, 5 Drawing Sheets

DATA BLOCK SIZE ≤ B

DATA BLOCK SIZE > B

EFFICIENT COMMAND DELIVERY AND DATA TRANSFER

The subject application is a continuation of U.S. patent application Ser. No. 09/409,253, filed Sep. 30, 1999, entitled "Efficient Command Delivery and Data Transfer," now as U.S. Pat. No. 6,542,941.

Also, the subject application is related to U.S. patent application Ser. No. 10/448,676 (Attorney Docket No. P7411C), filed May 29, 2003, entitled "Adaptive Messaging," which is a continuation of U.S. patent application Ser. No. 09/461,237 (Attorney Docket No. P7411), filed Dec. 16, 1999, entitled "Adaptive Messaging," now U.S. Pat. No. 6,615,282.

BACKGROUND

1. Field of the Invention

This invention relates generally to methods and apparatus for transferring commands and associated data blocks. In particular, the present invention relates to methods and apparatus for efficiently transferring commands and their associated data between various devices in a network or in a server architecture.

2. Description of the Related Art

The latency incurred when transferring data can greatly diminish the performance of networks and server architectures since the transferring and the transferee input/output (I/O) devices are usually unable to engage in other operations until the data transfer is complete. This latency is longer and even more complicated in networks and server architectures than in other computer systems because there is so much competition for network and server resources including system memory, processor(s) and multiple I/O devices. This can be quite disadvantageous in networks and server architectures where a large number of data blocks are frequently transferred between the processor, memory and several different I/O devices and/or the data blocks are of widely different sizes. Indeed, the lack of efficiency in transferring data blocks may have a larger effect on overall performance than the speed or other performance characteristics of the elements in the network or server architecture. It also may be that the buses and/or I/O adaptor cards connecting I/O devices to the processor are the bottleneck and the performance of these I/O subsystem components needs to be improved.

Conventional servers typically have multiple adaptor cards, each of which usually supports multiple I/O devices. A server may have a significant number of I/O devices configured in a load/store configuration such as shown in FIG. 1. Even though the processor may perform optimally, the performance of the server is still less than optimum because the I/O devices in the server may be of radically different types, store different kinds of data and/or vary from each other in the addressing sequence by which the data blocks containing the data are written and read out. For example, a pre-recorded CD-ROM may store large contiguous blocks of image data and the read out of such image data by an optical disk drive may consist of several smaller sequential reads. Another I/O device may store heavily fragmented user data and the data readout from such a device rarely consists of large blocks of data.

More particularly, in the example of FIG. 1, there is shown a processor P, system memory SM, I/O adaptor card A, hard disk HD, I/O adaptor card B, a network interface card NIC, I/O adaptor card C and a CD-ROM drive CD, all connected along an input/output bus, for example, a Peripheral Component Interconnect (PCI) synchronous bus as described in the latest version of "PCI Local Bus Specification, Revision 2.1" set forth by the PCI Special Interest Group (SIG) on Jun. 1, 1995. The PCI architecture provides the most common method currently used to extend computer systems for add-on arrangements (e.g., expansion cards) with new disk memory storage capabilities.

In this load/store configuration, taking a write command, for example, suppose the processor P wishes to write a block of data within the hard disk HD. First, as shown in FIG. 2, the processor P stores the command and its associated data to be written within a block A within the system memory SM. The processor P transfers a command to the register on the PCI I/O adapter card A via a path over the system bus, PCI bus bridge, and PCI bus. This tells the I/O adapter card A that a new command has been issued. I/O adapter card A must decipher that command and then read system memory SM to obtain the address of the write command. It must also read a pointer, which is the value representing an address within the system memory SM where the data associated with the command can be found. (The pointer may be virtual or physical and the location of the data is not necessarily contiguous with the location of the command. Indeed, the data may be split, requiring a Scatter/Gather List (SGL) to describe the locations of the data.) The I/O adapter card A then goes to the address of system memory SM pointed to by the pointer. The block of data A is read from the system memory back to the I/O adapter card, which will require several more fetches. The data is then subsequently written from the I/O adaptor card A to the hard disk HD. Even if the processor sets aside known areas for the commands in system memory SM so that the I/O adaptor card A always knows the address of the command, the I/O adaptor card would still need to read the write command to know where the data is located and to perform the fetches to obtain the data.

A similar procedure occurs when the processor P reads a block of data from the hard disk HD, i.e., the adapter card A would store the block of data within a block B within the system memory SM, then pass an indication to the processor P that the read process from the hard disk HD has been finished, whereupon the processor P can access the block B within the system memory SM to obtain the data. Such a conventional procedure (illustrated generally in FIG. 3) of sending a command with pointer (step 1), waiting for and receiving a request for data (step 2) and subsequently sending the data in response to the request (step 3) has substantial inherent latencies and delays. The procedure is very inefficient and slows down the entire system since many processor cycles will pass before the data transfer is completed.

SUMMARY

The present invention is directed to the delivery of commands and transfer of data associated with the commands. A method of delivering a command from an initiator device also transfers data identified by the command to a target device. The data is transferred between the initiator device and the target device according to a selected maximum payload size. The method includes determining whether or not the size of the data associated with the command is greater than the selected maximum payload size. If the size of the data associated with the command is not greater than the selected maximum payload size, then a block is transferred to or from the target device which includes the command and all of the data associated with the command. If the size of the data associated with the command is greater than the selected maximum payload size, then a block is transferred to or from the target device which includes the command, an amount of data associated with the command equal to the selected maximum payload size and an indication that not all of the data associated with the command was included in the transferred block.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation.

DETAILED DESCRIPTION

An example embodiment of the present invention seeks to decrease the inefficiencies of the transfer of data to input/output devices in a server architecture, such as what occurs when an I/O data block is transferred to or from a mass storage device such as a hard disk. In particular, PCI compliant I/O adapters cannot accomplish data transfers without the multiple steps discussed above. Computer systems generally have a processor, associated system memory, an input/output (I/O) device, and at least one bus, such as a PCI bus, connecting these components. A server is a type of computer system having an architecture or otherwise designed to be able to support multiple I/O devices and to transfer data with other computer systems at high speed. (Due to recent advances in the performance and flexibility of computer systems, many modern computers are servers under this definition.) Although many servers currently utilize PCI buses, the example embodiment of the invention set forths a data transfer where the transferee device has remote direct memory access (RDMA) to virtual addresses, thus enabling protected, target-managed data transfer.

The example embodiment attempts to reduce the latency when an element of the host server, such as one of the processors, attempts to write a data block to the hard disk drive either for the execution of instructions or to store the data block in system memory and to optimize the coordination of the transfer of I/O data blocks. For a disk drive, the data block is the unit of addressing and data transfer. If the value of one byte is to be updated on a disk, then the data transfer would include a block of data (512 bytes, for example) that contains the byte of interest. The byte value in the copy of the block held in memory would be updated, and then that block would be transferred from memory to the drive, overwriting the old block stored on the disk. However, the method according to the example embodiment is not limited in its application to disk drives or storage devices. In particular, the method according to the example embodiment may be useful for transferring data among computers and other devices on a network since data latency is critical in such environments. The data may be transferred in blocks of different sizes depending upon, for example, the target device, the transfer protocol (such as, for example, ethernet packets), etc.

One example application of the invention is in a processor or chipset incorporated in the input/output control circuit of a server device to operate in conjunction with a processor, such as the Intel Pentium II Xeon™ or Pentium III Xeon™ processor. However, such an embodiment is but one possible example of the invention which may, of course, be applied in any computer having a processor and an input/output device and indeed in any server architecture where an improvement in writing and reading data blocks to or from an I/O device is desired for whatever reason.

Figure 4:
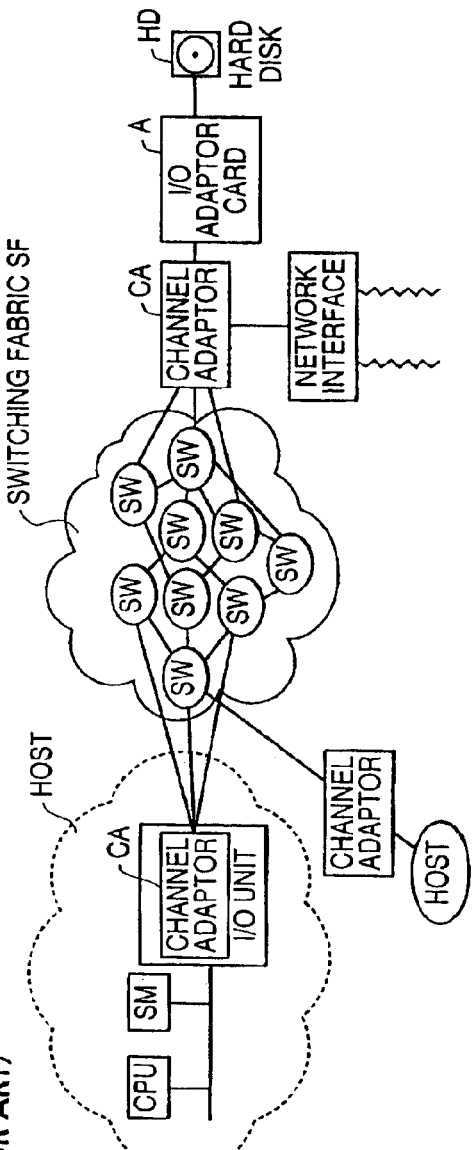
FIG. 4 is a diagram illustrating a switched fabric configuration in which the command delivery and data transfer method according to an example embodiment of this invention may be advantageously performed.

One possible application of the invention is in a server architecture with the switched fabric configuration shown in FIG. 4. More particularly, the configuration is preferably of a Next Generation I/O (NGIO) architecture allowing remote direct memory access and the server employs message passing in compliance with the NGIO standard, Version 1.0, published Jul. 22, 1999. (This application of the method and apparatus of the invention is exemplary only. The method and apparatus of the invention are also applicable to non-switched point-to-point connection links in other configurations or networks.) Such a server architecture might include, as shown in FIG. 4, a host having at least a processor P such as an Intel Pentium II Xeon™ or Pentium III XEON™ processor, system memory SM, and an input/output I/O unit containing a channel adaptor CA. These devices of the host may be all connected along a single bus as shown, or by multiple buses, or may be connected by point-to-point connections. The external data transfers are optimized through the I/O unit at all times. This helps avoid the processor or other elements from having to expend system resources to accomplish transfer of I/O data blocks since there may be access conflicts with other functions. Of course, a server can operate as a host when initiating a data transfer or it can operate as a target device when receiving a data transfer initiated by another device.

The channel adapter CA of the I/O unit, in turn, is connected to a switching fabric SF, which may contain many different switches SW and redundant paths throughout the fabric, such that a plurality of messages can be traveling through the switching fabric at any given time. Accordingly, when the processor P issues a write command, for example, the processor P now simply passes the same to the channel adaptor CA which injects it into the switched fabric SF, such that the processor P does not have to wait for processing of the and locking of the system bus, but instead go on to perform other processing operation until the processing is completed.

According to the present invention, the channel is any means of transferring data, including but not limited to virtual channels, used to transfer data between two endpoints. While the example embodiment is an NGIO implementation and thus supports the channel definition provided in the specification identified above, the present invention is not so limited. In accordance with the implentation in the NGIO specification, once injected into the switched fabric SF, the write command travels through the switches and eventually arrives at a second channel adapter CA where it can be given to an I/O adaptor card A where it is subsequently written to the hard disk HD or to a network interface where it is subsequently transferred to another computer device on a connected network (not shown). Accordingly, the inherent delays in deciphering the command and writing of the data as required by the I/O adaptor card A are not experienced by the processor P which is on the other side of the switching fabric, and can continue processing. As shown in FIG. 4, the message passing configuration can contain a plurality of channel adapters CA and host servers connected to the switching fabric SF, such that there can be a multitude of different messages traveling through the fabric and where all of the hosts can continue operating while their messages are traveling through the switching fabric.

Figure 5:
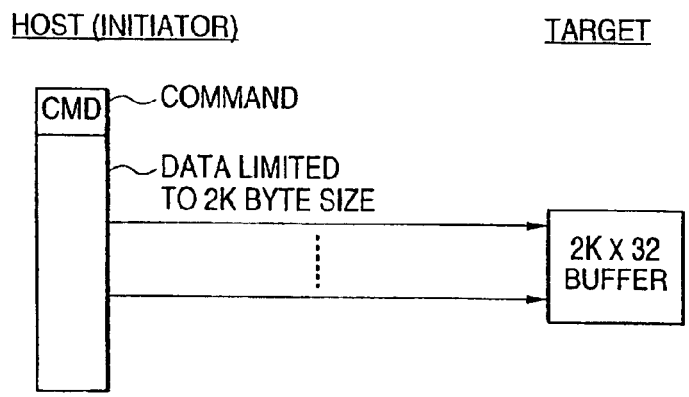
FIG. 5 is a chart general illustrating a conventionally implemented solution intended to address the delays in data transfers.
Figure 6:
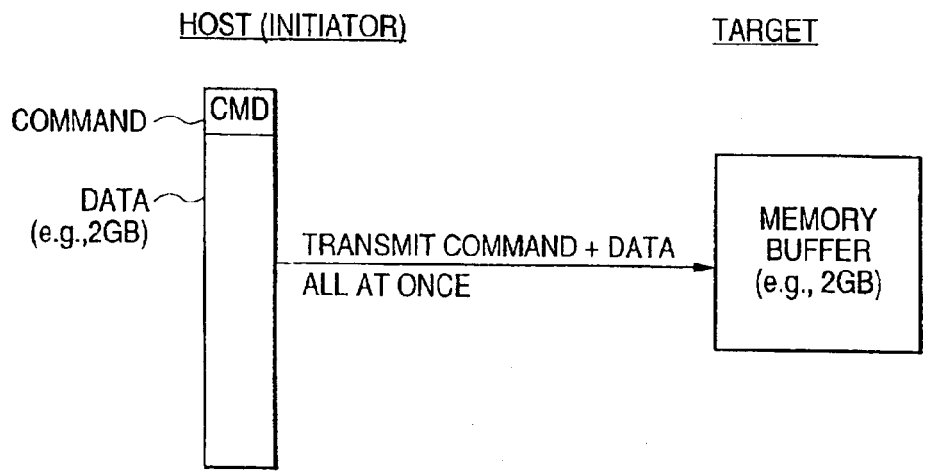
FIG. 6 shows another conventional solution intended to address delays in data transfers.
Figure 7:
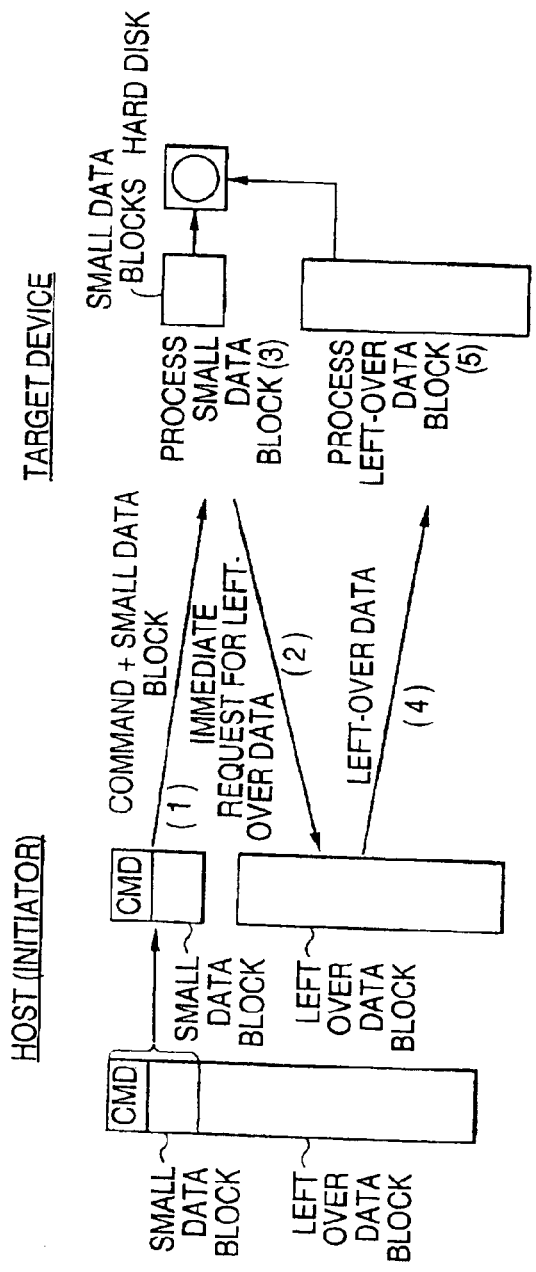
FIG. 7 generally illustrates the procedure of an example method embodiment to efficiently deliver commands and transfer data.

Turning now to FIGS. 5–7, illustrating and describing a plurality of examples for understanding the invention. One possible solution is shown in FIG. 5. More particularly, the data is limited to some predetermined size, e.g., a 2 kilobyte size. By limiting the data block size, the constraints on the target buffer are released since it is known which maximum, reasonable size of data is always going to be obtained, and thus it is easy to provide a smaller reasonably sized buffer in the target device. The problem with such an arrangement is that there is a limitation in block transmission size, thus requiring large blocks of data to be sliced into smaller blocks, with a header identifier attached to each of the smaller blocks. Such smaller blocks are repeatedly sent until all of the data has been transferred. This solution increases the number of data transfers, the amount of data being transmitted across the network, is fixed to the size of the buffer, and also represents significant record-keeping problems.

Figure 1:
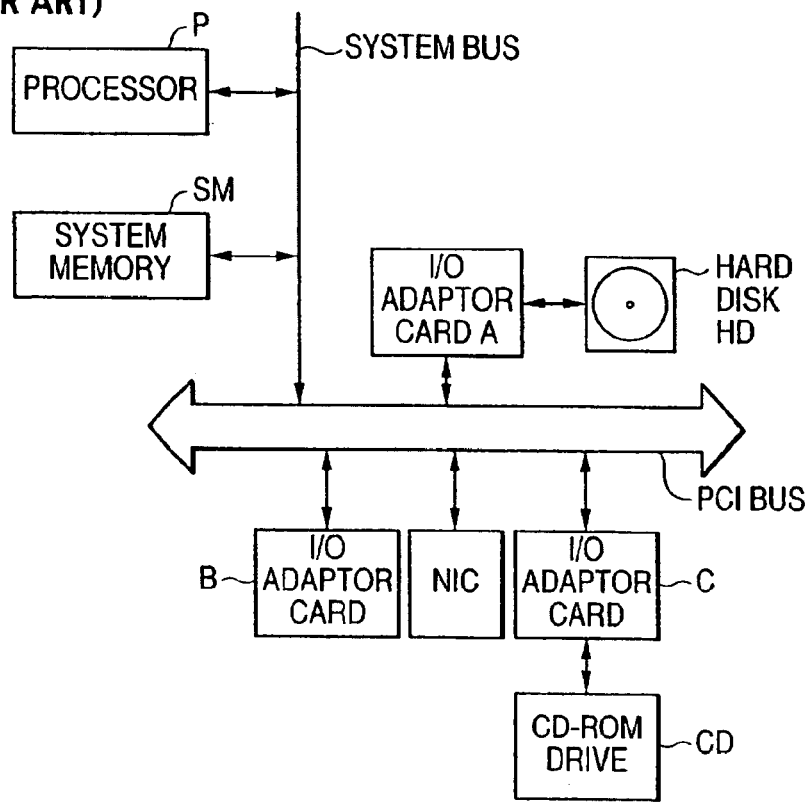
FIG. 1 is a generalized block diagram providing a basic illustration of a server architecture having a conventional load/store configuration.
Figure 2:
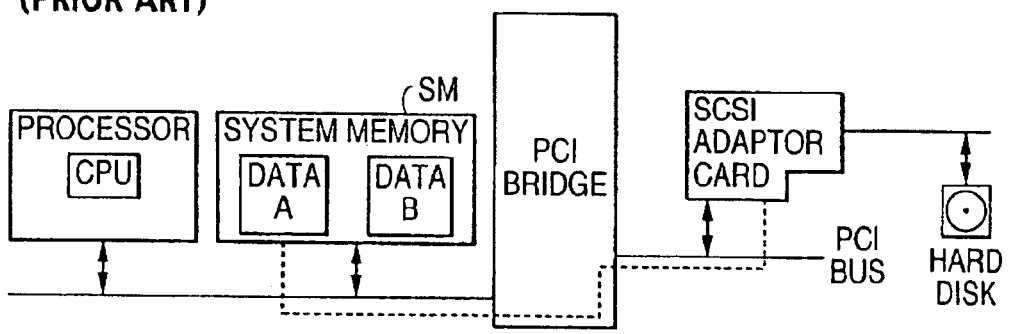
FIG. 2 is a somewhat more detailed diagram of a server architecture showing the conventional transfer of data blocks A and B from a CPU to a hard disk.
Figure 3:
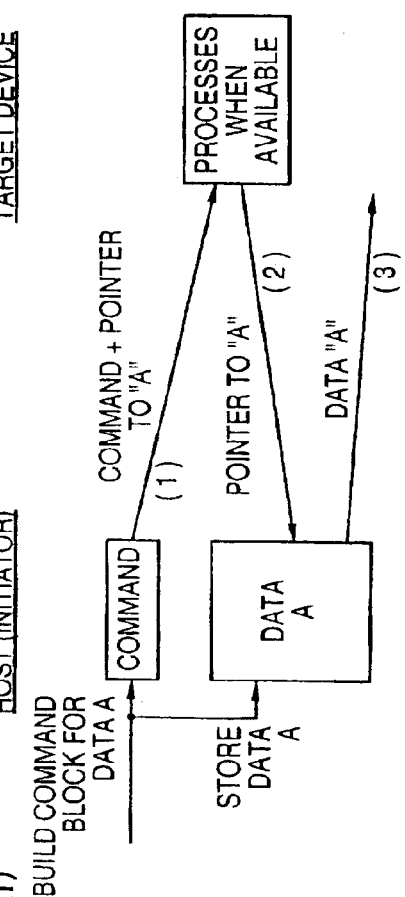
FIG. 3 is a chart illustrating the steps of a conventional write operation in which an I/O data block is transferred from an initiator to a target device on a network.

FIG. 6 illustrates the solution of how, in order to avoid the ping pong back and forth shown in FIG. 3, it would be nice to be able to transfer the command and all of the data at once. Such is possible with small data blocks. However, a problem is encountered where the data block is excessively large. More particularly, if the data block, for example, is 1 or 2 megabytes, a problem exists in that a 1 or 2 megabyte buffer memory size would then have to be provided within the target device. Such an excessive memory requirement is not cost effective. Accordingly, transfer of the command and all of the data at once may not be feasible in many instances.

Accordingly, FIG. 7 shows a large data block which is divided into smaller size data blocks and a left-over data block. Also shown is a series of operations with the present invention. More specifically, first as indicated by (1), a command plus a certain amount of data is transmitted across the switched fabric to the target. Accordingly, at least a portion of the data is immediately transferred with the command. If the data is smaller than the certain amount, the entire data block can be transferred with the command, thus resulting in an immediate advantage. However, if the data block is bigger than the certain amount which can be transmitted with the command, the target immediately recognizes that additional data will be required (e.g., by referencing a flag in the header), whereupon the target can immediately issue a request (or multiple requests which transfer the data in multiple pieces in the case of a very large transfer) for the left-over data as indicated by (2) in FIG. 7. The flag can be included within the header of the command, and can be any type of flag, e.g., simply a single bit indicating that there is left-over data or can be more complex such as an address of the left-over data. In any case, the request for left-over data is immediately issued from the target device without waiting to process the other parts of the command or the data in the small data block. After the request is forwarded to the initiator, the target device can start to process the command together with the small data block (3). The left-over data is transmitted across the switched fabric (4), again without waiting for the processing of the command and the small data block in step 3. However, at this point, an adequate buffer is provided in the target device in expectation of the left-over data, preferably before the command and small data block are processed. Regardless of whether the target has finished processing the command and small block of data in step 3, the left-over data is immediately grabbed. If the command and small data block are still being processed, the left-over data is stored in the buffer and processed immediately after the command and small data block. If the command and small data block have already been processed, the left-over data is immediately processed (5). Accordingly, a substantial portion of the previous inherent delays are avoided, thus achieving the advantages of the present invention.

Figure 9:
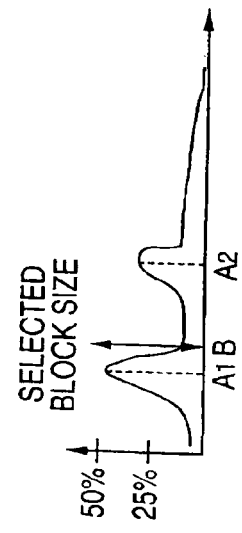
FIGS. 8 and 9 show examples of the distribution of data transfer sizes and the selection of maximum payload sizes according to one possible embodiment of the invention.
Figure 8:
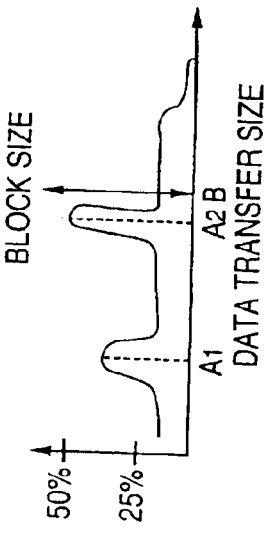

Of course, the parameter of primary importance is the selection of the amount of data, called the maximum payload size, that can be transferred in one of the transfer blocks. If the allocation of memory in a computer device was inconsequential in terms of cost, power consumption, etc., then of course an extremely large of memory could be provided. Since that is not the case, one important point of the present invention is that an advantageous memory size/latency tradeoff is made by proper selection of the maximum payload size for a target device and data transfer. In the two transfer size graphs shown in FIGS. 8 and 9, the left hump or peak in the graphs display situations in which the data block to be transfered is relatively small in size and the commands are sent with a relatively small amount of data, whereas the right-hand peak represents situations where the data block to be transfered is relatively large in size and the command is sent with a large amount of data. Such a data transfer is problematic as illustrated in FIG. 6. Accordingly, in order to improve the efficiency of the present invention, the host device selects the maximum payload size B of the data block which can be transmitted together with the command. The block size can be selected in any manner. However, it may optimally be based on: 1) the distribution of the sizes of the data blocks transferred to and from the target device; 2) the typical number of outstanding commands; and/or 3) the typical processing time for a command. Preferably, the selected maximum payload size is slightly to the right of or greater in size than the highest peak representing the most typical sized data block. As shown in FIGS. 8 and 9, the selected maximum payload size B in FIG. 8 would be to the right of the right-hand peak $A_2$ since that is the highest peak and the selected block size in FIG. 9 would be slightly to the right of the left-hand peak $A_1$ since that it is the highest peak. The data transfer size distribution may be caused by, for example, different target devices or different types of data files. Alternatively, the selected maximum payload size B could be changed according to the most recent data transfers with any number of different algorithms and weighting factors, moving averages, etc., being available to determine and perhaps, dynamically change the selected maximum payload size B so that it is determined in firmware or software rather than being preset in hardware.

Figure 10:
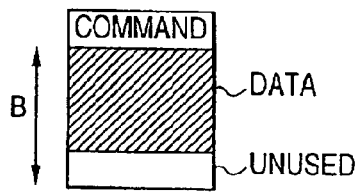
FIGS. 10 and 11 are graphical illustrations of command delivery and data transfer depending upon whether the size of the data transfer is greater than the selected maximum payload size in an example embodiment of the invention.
Figure 11:
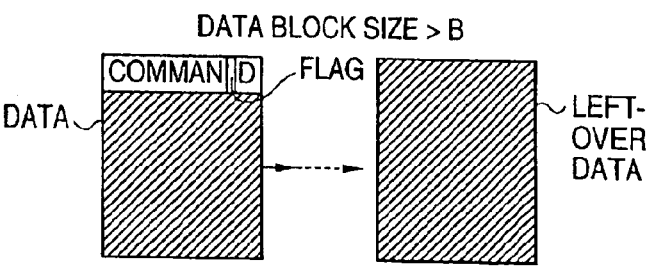

FIGS. 10 and 11 illustrate the transferred data blocks containing the command and data blocks in relationship to the selected maximum payload size B. (The transfer block may also contain a header which is not shown for purposes of clarity.) FIG. 10 is a first example wherein the data to be transferred is less than or equal in size to the selected maximum payload size B. FIG. 11 is a second example wherein the data to be transferred is greater in size than the selected maximum payload size B.

Figure 12:
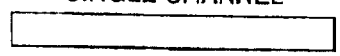
FIGS. 12–14 illustrate different possible channel implementations which can alternatively be used with the example embodiment of the invention.
Figure 13:
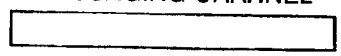
Figure 13:
Figure 14:
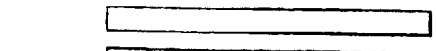
Figure 14:
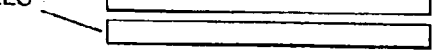

FIGS. 12–14 show several channel examples useful in understanding aspects of the invention. More particularly, turning first to FIG. 12, there is shown a single channel which is used to transmit across the channel adapters. More particularly, first the command and small data block are transmitted, and subsequently the left-over data is transmitted along the same single channel. Such arrangement is advantageous in that there is only a single channel, but is disadvantageous in that if a huge block of data (e.g., 2 gigabytes) is to be transmitted, such huge data block transmission will tie up the single channel, thus blocking all other messaging.

Accordingly, a further advantageous arrangement is shown in the channel example shown in FIG. 13. More specifically, such example includes two channels. First there is shown a messaging channel which is used exclusively for transmitting the command and small data blocks. Further shown is a bulk data channel which can be used to send left-over data. Accordingly, if there is a huge data block to be transmitted across the fabric, the bulk data channel is used to transmit such left-over data, thus not tying up the messaging channel which can continue to operate and transmit messages across the fabric. Dual channels are employed, but is advantageous in that bulk data or left-over data transmission will never tie up the messaging channel. Although the invention can be practiced using a single channel, it is generally more advantageous to use multiple channels.

In FIG. 14, there is shown a single messaging channel and a plurality of data channels 1, 2, 3. With such arrangement, left-over data can be sent over a single one of the channels 1, 2, 3. Such is advantageous in that only one data channel will be tied up transmitting any bulk or left-over data. In contrast, multiple channels can be used in parallel for faster transmission of the bulk or left-over data. More specifically, the bulk or left-over data can be cut up into equally sized blocks and transmitted over various channels.

There are different possible points in the server architecture to implement the delivery method. The first possible implementation is at a somewhat centralized (but not shared) location. This implementation takes advantage of the fact that I/O adaptor cards are a standard component of input/output subsystems and generally don't include any specialized circuitry or software for effectuating the described method of transferring data blocks. In the context of this application, they can be considered "dumb" I/O cards. An example implementation of the invention uses such dumb I/O cards because they are standardized and less expensive than non-standard I/O cards, and performs the method elsewhere in the network configuration. The method may support a different block size B for each I/O device. In such case, it then looks at the block size for the respective I/O device and the data transfer is carried out per I/O device based on the size of the data blocks generally transferred for operation of that particular I/O device. Also, for example, one I/O device may be a CD-RW disk drive and the other may be a high speed communications interface (e.g., an asynchronous transfer mode (ATM) interface). Preferably, the method is implemented as firmware or software, although it may be accelerated with hardware support.

A set system length parameter is tuned to the target device or some basic unit. Preferably, a basic unit is set for the data block size B which is equal to a multiple of the data storage format of the I/O device. For example, in a disk drive storing data in 1 kilobyte sectors, it is preferable that the predetermined block size be a multiple of kilobytes. However, the data blocks may be of different sizes controlled according to the firmware or software. The firmware or software may or may not maintain an internal history of data transfers to each I/O device and adjust the block size B according to the history to provide a further level of adaptability to adjust to operating conditions. The block size B can thus respond to conditions of the I/O device at the time of operation, rather than a static design made at decision time or boot time.

Although an example embodiment, the invention is not limited to the switched fabric configuration or to a host server as illustrated in FIG. 4. Indeed, an advantage of the exemplary embodiments of the invention is that they are particularly useful and widely adaptable to any I/O device having latency in data transfer operations. In this way, data transfers can be efficient in both a server that has a great deal of network I/O interfaces and a server that has a great deal of I/O disk interfaces. The example embodiments will automatically adapt to transfer characteristics in which large blocks of data are generally transferred rather than small blocks of data. Indeed, the example embodiments will adapt to any I/O data interface. There will be no need for a network administrator to select an appropriate data transfer buffer size in the setup configuration.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A method comprising:
at least one of issuing a block from a first device to a second device and receiving the block at the second device, the block including a write command that is associated with data to be written in response to the write command, and if the data has a size that is less than or equal to a maximum payload size, the block also including all of the data with which the write command is associated.

2. The method of claim 1, wherein:

the second device is associated with a data storage format; and the block is associated with a data block size that is equal to a multiple of the data storage format.

3. The method of claim 1, wherein:

the block is associated with a data block size; and the method further comprises adjusting the data block size.

4. The method of claim 1, further comprising:

determining whether the size of the data with which the command is associated is greater than the maximum payload size.

5. The method of claim 1, further comprising:

selecting the maximum payload size.

6. The method of claim 1, wherein:

the first device comprises an initiator device; and the second device comprises a target device.

7. A method comprising:

at least one of issuing one block from a first device to a second device and receiving the one block at the second device, the one block including a write command that is associated with data to be written in response to the write command, and if the data has a size that is greater than a maximum payload size, the one block including the write command, an amount of the data that is equal to the maximum payload size, and an indication that less than all of the data is included in the one block.

8. The method of claim 7, further comprising:

at least one of transferring to the second device from the first device another block and receiving at the second device the another block, the another block including a remaining portion of the data that is not included in the one block.

9. The method of claim 8, further comprising:

at least one of issuing a request from the second device and receiving at the first device the request, the request requesting transfer to the second device of the remaining portion.

10. The method of claim 7, wherein:

the first device comprises an initiator device; and the second device comprises a target device.

11. An apparatus comprising:

circuitry that is capable of at least one of issuing a block from a first device to a second device and receiving the block at the second device, the block including a write command that is associated with data to be written in response to the write command, and if the data has a size that is less than or equal to a maximum payload size, the block also including all of the data with which the write command is associated.

12. The apparatus of claim 11, wherein:

the second device is associated with a data storage format; and the block is associated with a data block size that is equal to a multiple of the data storage format.

13. The apparatus of claim 11, wherein:

the block is associated with a data block size; and the circuitry is also capable of adjusting the data block size.

14. The apparatus of claim 11, wherein:

the circuitry is also capable of determining whether the size of the data with which the command is associated is greater than the maximum payload size.

15. The apparatus of claim 11, wherein:

the circuitry is also capable of selecting the maximum payload size.

16. The apparatus of claim 11, wherein:

the first device comprises an initiator device; and the second device comprises a target device.

17. An apparatus comprising:

circuitry that is capable of at least one of issuing one block from a first device to a second device and receiving the one block at the second device, the one block including a write command that is associated with data to be written in response to the write command, and if the data has a size that is greater than a maximum payload size, the one block including the write command, an amount of the data that is equal to the maximum payload size, and an indication that less than all of the data is included in the one block.

18. The apparatus of claim 17, wherein:

the circuitry is also capable of at least one of transferring to the second device from the first device another block and receiving at the second device the another block, the another block including a remaining portion of the data that is not included in the one block.

19. The apparatus of claim 18, wherein:

the circuitry is also capable of at least one of issuing a request from the second device and receiving at the first device the request, the request requesting transfer to the second device of the remaining portion.

20. The apparatus of claim 17, wherein:

the first device comprises an initiator device; and the second device comprises a target device.

21. An article comprising:

a storage medium storing instructions that when executed by a machine result in the following:

at least one of issuing a block from a first device to a second device and receiving the block at the second device, the block including a write command that is associated with data to be written in response to the write command, and if the data has a size that is less than or equal to a maximum payload size, the block also including all of the data with which the write command is associated.

22. The article of claim 21, wherein:

the second device is associated with a data storage format; and the block is associated with a data block size that is equal to a multiple of the data storage format.

23. The article of claim 21, wherein:

the block is associated with a data block size; and the instruction when executed by the machine also result in adjusting the data block size.

24. The article of claim 21, wherein:

the instructions when executed by the machine also result in determining whether the size of the data with which the command is associated is greater than the maximum payload size.

25. The article of claim 21, wherein:

the instructions when executed by the machine also result in selecting the maximum payload size.

26. The article of claim 21, wherein:

the first device comprises an initiator device; and the second device comprises a target device.

27. An article comprising:

a storage medium storing instructions that when executed by a machine result in the following:

at least one of issuing one block from a first device to a second device and receiving the one block at the second device, the one block including a write command that is associated with data to be written in response to the write command, and if the data has a size that is greater than a maximum payload size, the one block including the write command, an amount of the data that is equal to the maximum payload size, and an indication that less than all of the data is included in the one block.

28. The article of claim 27, wherein:

the instructions when executed by the machine also result in at least one of transferring to the second device from the first device another block and receiving at the second device the another block, the another block including a remaining portion of the data that is not included in the one block.

29. The article of claim 28, wherein:

the instructions when executed by the machine also result in at least one of issuing a request from the second device and receiving at the first device the request, the request requesting transfer to the second device of the remaining portion.

30. The article of claim 27, wherein:

the first device comprises an initiator device; and the second device comprises a target device.

31. A system comprising:

a first device;

a second device;

channels to communicatively couple the first device and the second device;

the first device being capable of issuing a block to a second device via the channels;

the second device being capable of receiving the block via the channels; and the block including a write command that is associated with data to be written in response to the write command, and if the data has a size that is less than or equal to a maximum payload size, the block also including all of the data with which the write command is associated.

32. The system of claim 31, wherein:

the channels comprise point-to-point connections.

33. A system comprising:

a first device;

a second device;

channels to communicatively couple the first device and the second device;

the first device being capable of issuing a block to a second device via the channels;

the second device being capable of receiving the block via the channels; and the one block including a write command that is associated with data to be written in response to the write command, and if the data has a size that is greater than a maximum payload size, the one block including the write command, an amount of the data that is equal to the maximum payload size, and an indication that less than all of the data is included in the one block.

34. The system of claim 33, wherein:

the channels comprise point-to-point connections.

* * * * *